Aug. 29, 1967

A. G. SANGSTER 3,339,122

DIGITAL POSITIONAL CONTROL DEVICE

Filed March 23, 1964

*INVENTOR.*
ARLON G. SANGSTER
BY
*Edward Jetty*
ATTORNEY

Aug. 29, 1967  A. G. SANGSTER  3,339,122

DIGITAL POSITIONAL CONTROL DEVICE

Filed March 23, 1964  5 Sheets-Sheet 2

*INVENTOR.*
ARLON G. SANGSTER
BY
ATTORNEY

Aug. 29, 1967   A. G. SANGSTER   3,339,122
DIGITAL POSITIONAL CONTROL DEVICE
Filed March 23, 1964   5 Sheets-Sheet 3

INVENTOR.
ARLON G. SANGSTER
BY
*Edward J. Utz*
ATTORNEY

INVENTOR.
ARLON G. SANGSTER.

INVENTOR.
ARLON G. SANGSTER.
BY
*Edmund Jetty*
ATTORNEY

United States Patent Office 3,339,122
Patented Aug. 29, 1967

3,339,122
DIGITAL POSITIONAL CONTROL DEVICE
Arlon G. Sangster, Worcester, Mass., assignor, by mesne assignments, to The Carlton Machine Tool Company, Cincinnati, Ohio, a corporation of Ohio
Filed Mar. 23, 1964, Ser. No. 353,867
10 Claims. (Cl. 318—18)

My invention relates to a new and improved automatic linear motion and positioning control means.

My invention is a positional control device which includes electrical and electronic control in the form of tubes and relays together with a multi-speed drive and a position encoder.

My device depends upon making contact between various electrical paths rather than maintaining contact.

The principal object of my invention therefore is the provision of a positional control device which is operable in response to some form of data input from a tape reader or a pushbutton selector switch, or other means of sending intelligence through the electronic and electrical controls.

A further object of my invention is that up until the device goes into a final stage, it will retain its directional sensing or position characteristics.

A further object of my invention is the use of printed circuits resulting in a compact device with a minimum of parts. However, my device operates at only two fixed speeds. The encoder of my invention is a low torque, low inertia device.

A further object of my invention is to simplify the circuitry and reduce the final positioning error by using a uni-directional final approach instead of a bi-directional final approach.

In my invention I provide a drive consisting of a uni-directional motor connected by means of a timing belt to a shaft which is in turn connected to another shaft by a double reduction worm gear. The last named shaft is connected to another shaft with a timing belt. These shafts are so arranged that they all lie parallel to each other with equal spacing between them. The outboard end of each of the shafts is connected into the driving half of an electromagnetic clutch. The output end of each of the electromagnetic clutches is connected to another shaft upon which is mounted a spur gear which meshes with its adjacent spur gear or gears, forming a gear train of four gears. I provide four clutches, one for rapid forward, one for rapid reverse, one for slow forward and one for slow reverse. The last named of the previously mentioned shafts which carry spur gears is directly connected by means of an extension to a lead screw, and is also directly connected to the encoder. I also provide on this last mentioned shaft an electromagnetic brake which serves to lock the lead screw against rotation when the final position has been reached.

Figure 8:
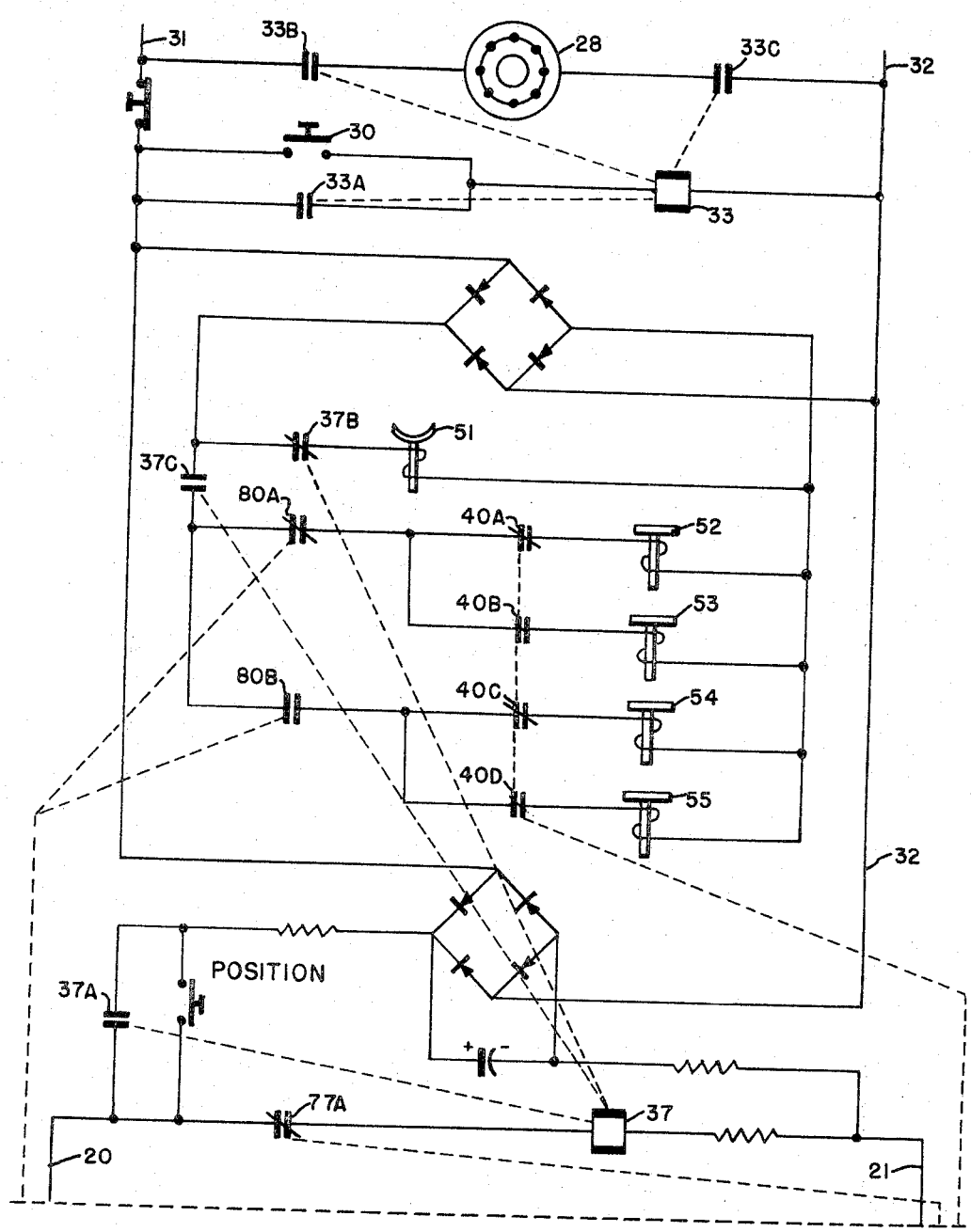
Figure 8A:
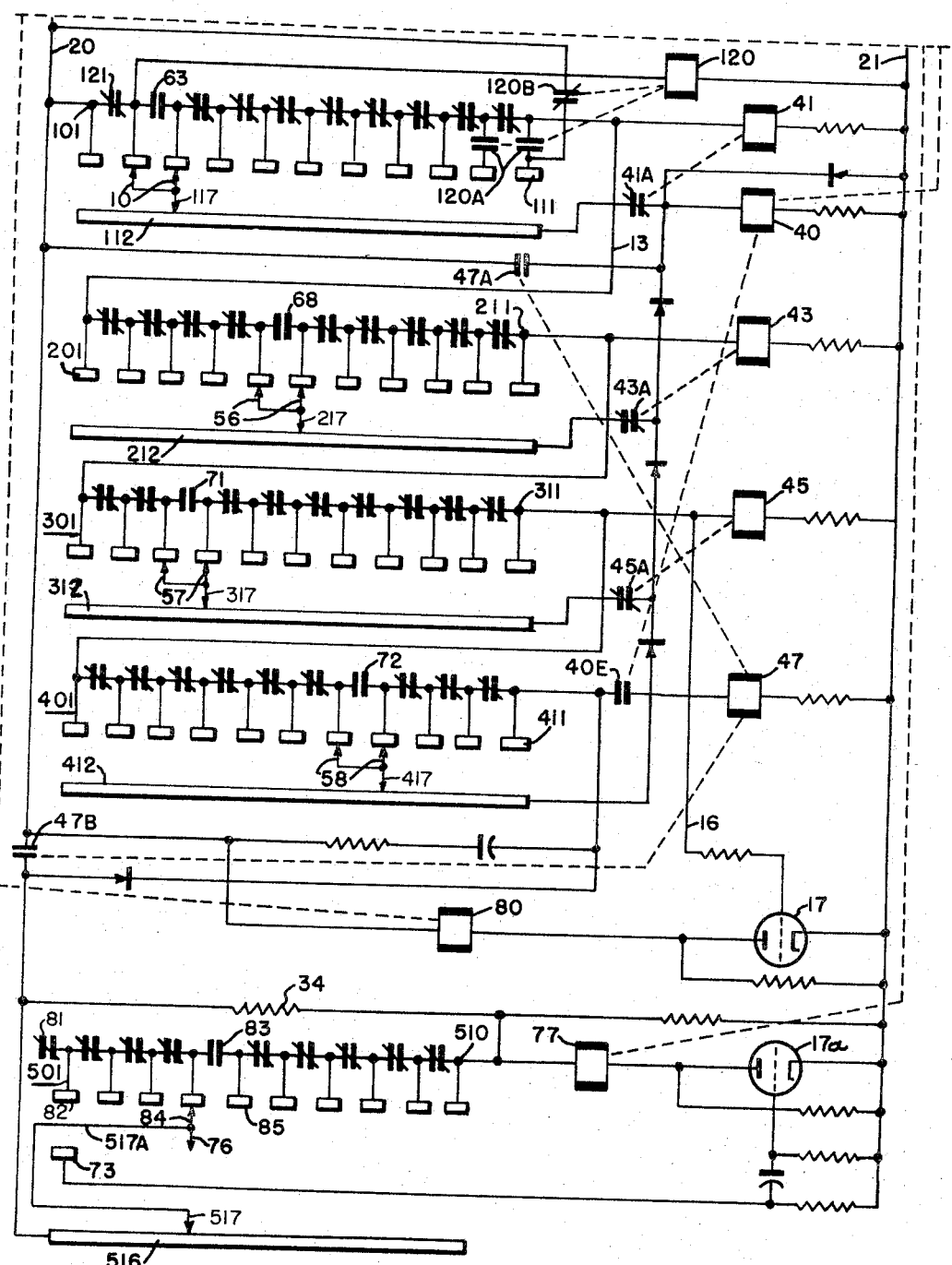

FIGURES 8 and 8A taken together comprise a complete schematic wiring diagram for the A.C. motor drive means, D.C. supply and control circuitry, data input selector device, encoder and electrical and electronic control circuits.

Figure 9:
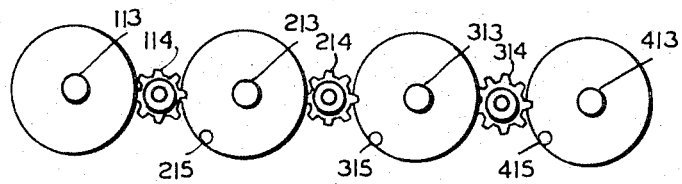

FIGURE 9 illustrates the mechanical relationship of the shaft in the encoder.

Figure 10:
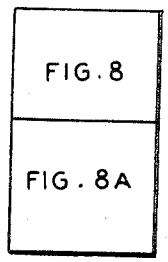

FIGURE 10 is a schematic view showing the relation of FIGURES 8 and 8a. If FIGURE 8 is placed at the top of FIGURE 8a, the positive potential leads 20 of the drawings in FIGURES 8 and 8a are connected and the negative potential leads 21 are similarly connected.

Figure 1:
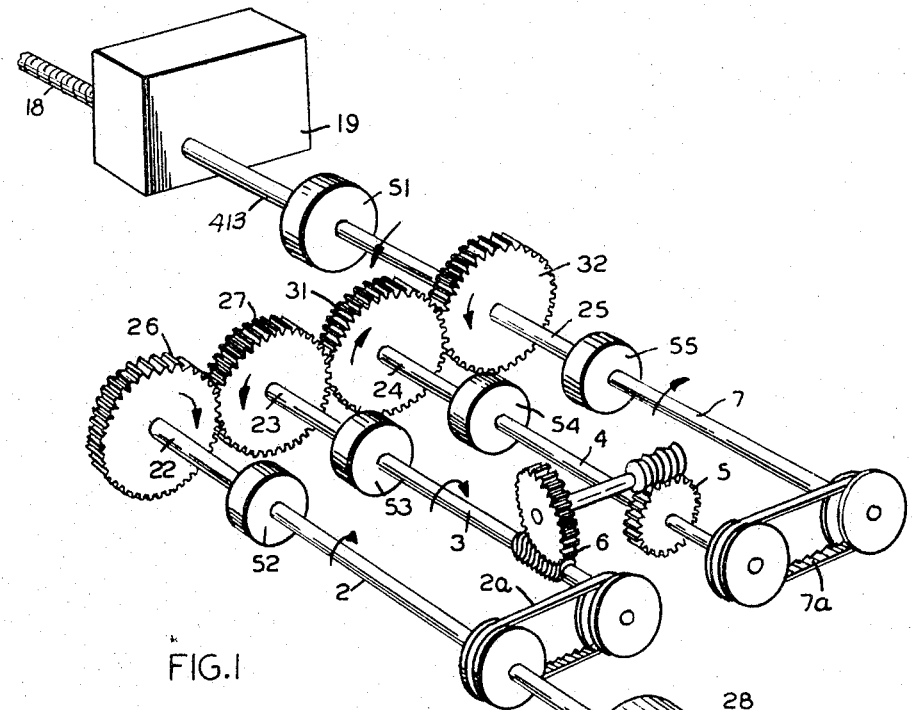
FIGURE 1 is a view in perspective of the encoder housing, lead screw and drive which comprises electromagnetic clutches and brake, and timing belts, spur gears and worm gears and drive motor.

With reference to FIGURE 1, I show a shaft connected to a screw employed as a means to move the controlled element (not shown) and driven by a uni-directional motor selectively through various clutches.

In the numbered parts of the drawings I show a drive motor 28, which is coupled to shaft 2, which in turn is connected by means of a timing belt 2a to shaft 3. Shaft 3 is connected to shaft 4 by double reduction worm gears 5 and 6. Shaft 4 is in turn connected to shaft 7 by means of a timing belt 7a. Shafts 2, 3, 4 and 7 are arranged so that all lie parallel to each other with equal spacing between them. The outboard end of each of the shafts 2, 3, 4 and 7 is connected into the driving half of an electromagnetic clutch 52, 53, 54 and 55. The other end of each of the electromagnetic clutches 52, 53, 54 and 55 is connected to each of four shafts 22, 23, 24 and 25 upon which are mounted four spur gears 26, 27, 31 and 32, which are in mesh, forming a train of spur gears. Clutch 52 is the rapid reverse clutch mounted between shafts 2 and 22. Clutch 53 is the rapid forward clutch mounted between shafts 3 and 23. Clutch 54 is the slow reverse clutch mounted between shafts 4 and 24. Clutch 55 is the slow forward clutch mounted between shafts 7 and 25. An extension of shaft 25 is directly connected to the position-sensing encoder 19.

Also mounted concentric with shaft 25 is an electromagnetic brake 51 which serves to lock the lead screw 18 against rotation when the final position has been reached.

If we engage clutch 52 or 54 this serves to rotate the lead screw 18 in a counterclockwise direction. If we engage clutch 53 or 55, the lead screw 18 will be rotated in a clockwise direction. Clockwise rotation of the lead screw 18 is associated with forward motion. Clutches 52 and 53 serve to cause the lead screw 18 to operate or rotate at rapid rates. Clutches 54 and 55 cause rotation at a slow rate.

The ratio of the rapid rate to the slow rate is at about fifty-to-one although this is not a limiting factor in my device.

Figure 2:
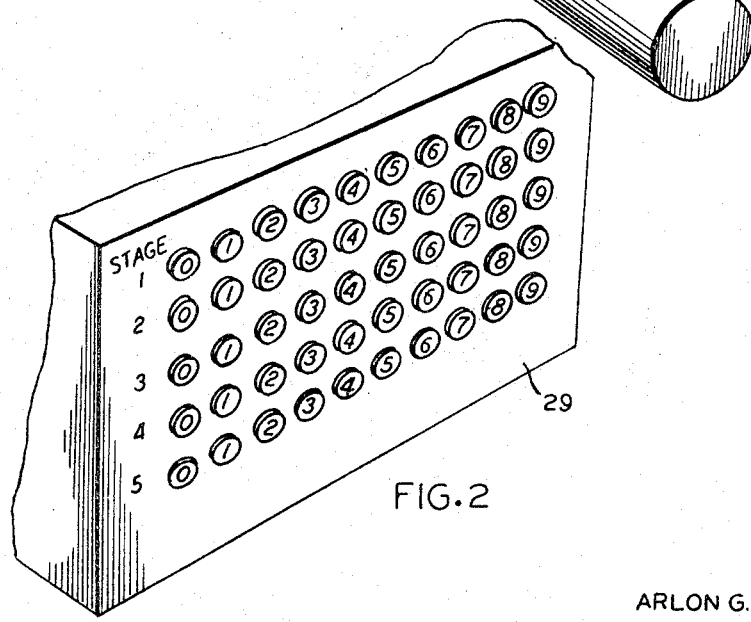
FIGURE 2 is a view in perspective of a data input device.
Figure 3:
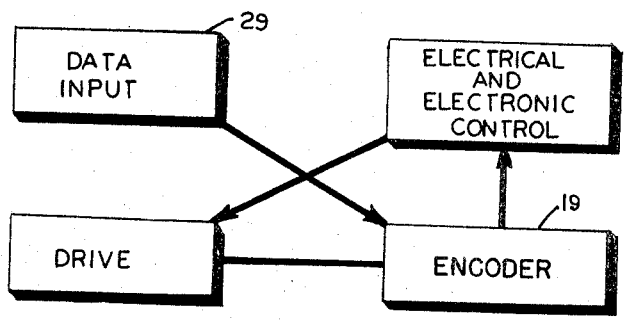
FIGURE 3 is a schematic diagram showing a data input, a drive connected with the encoder and the electrical and electronic control connected to the encoder and to the drive.

In FIGURE 2 I show a selector device 29, having 5 rows of buttons. The top row being for stage 1, the second row being for stage 2, the third row for stage 3 and the fourth row for stage 4 and the fifth row for stage 5 of encoder.

In FIGURE 2 each button operates to open a normally closed contact. Each horizontal row of buttons is interlocked, so that only one button can be depressed at a time and the selected button, when depressed, remains locked in the operated position until released by the operation of some other button in the same row. Operation of one button in each row opens one pair of contacts such as 63, 68, 71, 72 and 83 (FIGURE 8a) in each stage of the electrical control. This then represents a selected numerical decimal value to which I desire to position my control system.

In FIGURE 1, I show screw 18 connected directly to shaft 413 of the encoder 19.

Figure 6:
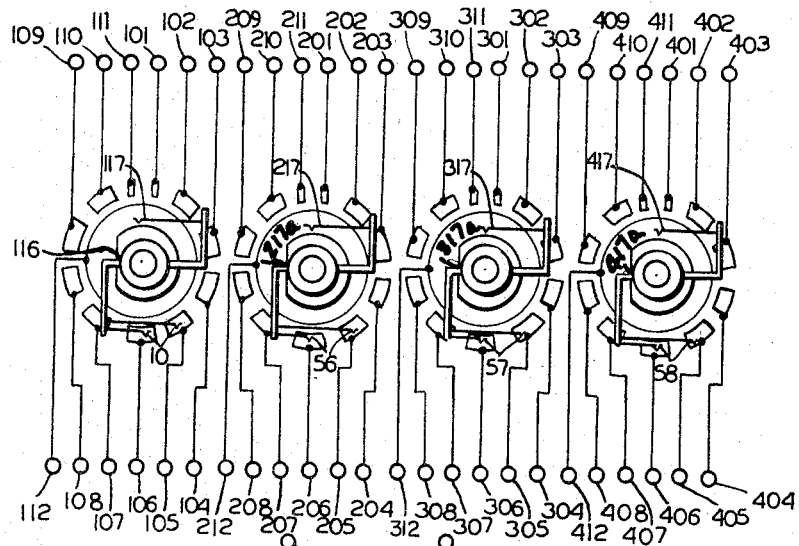
FIGURE 6 illustrates the arrangement of the commutators and brushes in the first four stages of the encoder.
Figure 7:
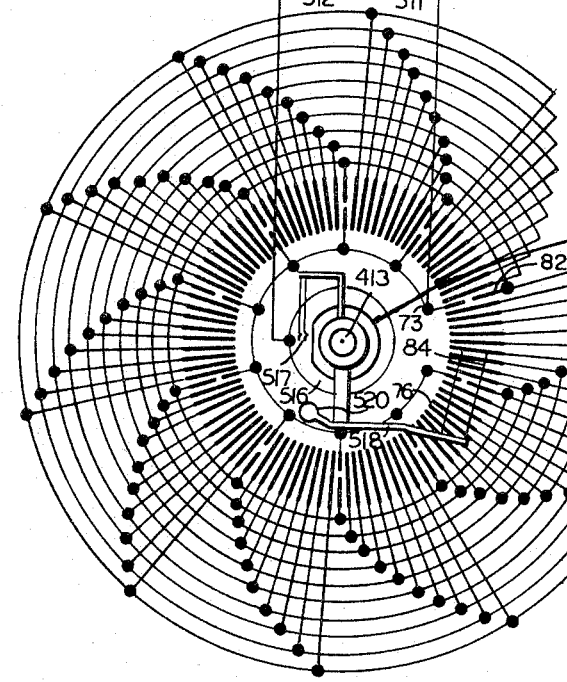
FIGURE 7 illustrates the arrangement of the finest increment stage brushes and commutator, the fifth stage of the encoder.

The encoder 19 consists of four parallel shafts, 113, 213, 313 and 413 (FIGURE 9) connected to each other serially, by means of index gearing 114, 214, and 314 and supported by suitable bearings. As shaft 413 is rotated, pin 415 contacts one tooth of pinion 314 which, through spur gearing, rotates a gear on shaft 313 one-tenth of a revolution. In like manner shaft 313 is connected to shaft 213 and shaft 213 is connected to shaft 113. Pins 315 and 215 operate in a similar manner to pin 415. Therefore, one thousand full turns of shaft 413 will rotate shaft 313 one hundred turns, shaft 213 ten turns and shaft 113 one turn. On FIGURE 6 on the end of shaft 113, brush assembly 116 is mounted and rotates with the shaft. This brush assembly 116 has three separate brushes. Brush 117 contacts a stationary slip ring shown at 112 (FIGURE 8a) and shown connected to terminal 112 (FIGURE 6) provide electrical continuity while rotating. Two brushes 10 are connected to brush 117 (FIGURE 6) by the brush assembly 116, to provide a common connection, and in turn, contact various adjacent angularly disposed contacts such as those connected to terminals 101 through 111 mounted on a printed circuit board (FIGURE 6). (These contacts, resembling commutator bars or segments shown in FIGURES 6 and 7, may be designated by the numbered terminals to which they are connected electrically.) The brush assembly 116 is mounted on shaft 113 by means of an insulated bushing. Brush assemblies 217a, 317a, 417a and 517a are similarly mounted on shafts 213, 313 and 413. Fixed slip rings providing continuous contact with these brush assemblies are connected to terminals 112, 212, 312, 412, and to 512 which connects to slip ring 516 (FIGURES 6 and 7).

In a similar manner brush assembly 217a having brushes 56 and 217 is arranged on shaft 213 and adapted to contact contacts 201 through 211. In a similar manner, brush assembly 317a, having brushes 57 and 317 is arranged on shaft 313 and adapted to contact contacts 301 through 311. In a similar manner brush assembly 417a having brushes 58 and 417 is arranged on shaft 413 and is adapted to contact contacts 401 through 411. Also arranged on shaft 413 but axially disposed is brush assembly 517a having brushes 76, 84 and 517. Brush 517 makes continuous contact with slip ring 516, while brushes 76 and 84 touch simultaneous and successively contacts 502 through 510 but, while brush 84 is touching contact 82 connected to terminal 501, brush 76 makes contact with 73 (connected to terminal 511). As input shaft 413 is rotated one one-hundredth of a revolution, brushes 76 and 84 (FIGURE 7) will move from one radial contact (501 through 510) to another excepting that, as brush 84 touches contact 82, brush 76 touches contact 73 The stationary contacts 401 through 411 through 411 shown in FIGURE 6 are arranged in a plane parallel to the stationary contacts 501 through 511, shown in FIGURE 7.

Relay description

A relay 33 is employed to start motor 28 through relay contacts 33b and 33c. Relay contact 33a is employed to seal in relay 33 (FIGURE 8). This is done by closing the momentary contact button 30 which actuates relay 33 and closes the contacts 33a.

Relay 37 is employed to initiate positioning cycle through relay contact 37a which also serves to seal in relay 37 during the positioning cycle.

Relay contact 37b is used to de-energize brake 51 during positioning cycle. Relay contact 37c is used to energize the bus to operate the clutches 52, 53, 54 and 55 during positioning cycle. Relay 40 (FIGURE 8a) when energized, serves to provide direction sensing selectively through contacts 40a, 40b, 40c and 40d to clutches respectively 52, 53, 54 and 55. When energized this relay will close the contacts 40b and 40d to forward direction clutches 53 and 55 respectively. When de-energized this relay will close the contacts 40a and 40c to reverse direction clutches 52 and 54 respectively.

Relay 80 when energized will operate contact 80b to slow clutches 54 and 55, when this relay is de-energized it will operate contact 80a to rapid clutches 52 and 53.

Relays 41, 43, 45 and 47 (FIGURE 8a) are employed to obtain correct sequence of operation during positioning cycle as will appear from the description below.

Relay 77 is energized at final position. Relay contact 77a is energized to open the bus to relay coil 37 which terminates the positioning cycle.

Operating of positioning cycle

To start positioning cycle, momentary contact pushbutton P (Position) (FIGURE 8) and seal in power through closing of contacts 37a. Normally closed contacts 37b are opened to de-energize brake 51 and normally opened contacts 37c are closed to energize bus to motion clutches 52, 53, 54 and 55.

In FIGURE 8a, the relative position of shunting brushes 10, 56, 57 and 58 to selected open contacts in the decimal decade strings 101–111, 201–211, 301–311 and 401–411 determines the direction and speed of the motion. If brushes 10 are on the potential side of the selected open contact 63, relay 40 is energized. Since relay 80 is de-energized, clutch 53 is energized through contacts 80a and 40b to operate motion in rapid forward, until brushes 10 shunt selected open contacts 63 and energizes relay 41 and supplies potential to wire 13. Contacts 41a of relay 41 opens to de-energize relay 40. This transfers control to the second stage of position, when the first stage of positioning brushes 10 shunt the selected open contact 63. Had the brush been on the no potential side of the selected open contact 63, relay 40 would have been de-energized and contact 40a would have been closed energizing clutch 52 (FIGURE 8) to operate motion in rapid reverse. Again, when brushes 10 shunt selected upon contact 63, both relay 41 and wire 13 are energized, thus transferring control to second stage (201–211).

If at any time during the subsequent positioning cycle the encoder 19 is moved due to inertia or other cause, shunting contact 10 will be caused to move, thereby removing potential from wire 13. This serves to transfer the control back to the first stage.

The second stage 201–211, brushes 56 and relay 43, is identical to the operation described in the first stage. If brush 56 is on the potential side of the selected open contact 68, relay 40 is energized to operate rapid forward clutch 53, FIGURE 8, through the closing of normal open contacts 40b. If brushes 56 (FIGURE 8a) are on the no potential side of selected open contact 68, relay 40 is de-energized and rapid reverse clutch 52 is energized through closing of normally closed contacts 40a. When brushes 56 shunt selected open contact 68, relay 43 is energized removing direction sensing by opening contact 43a, thereby transferring control to the third stage when potential is supplied to contact 301.

Figure 4:
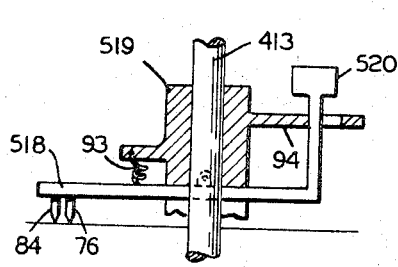
FIGURE 4 is a view of the brush assembly used on the last encoder stage.
Figure 5:
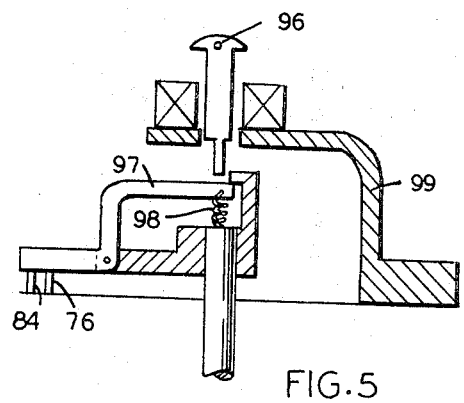
FIGURE 5 is a view of an alternate method of construction of the brush assembly shown in FIGURE 4.

The third-stage operation is identical to the first and the second stage. Brushes 57 shunt selected open contact 71 and then potential is supplied to wire 311 and wire 16 causing tube 17 to ionize and conduct energy to relay 80. Also at this point, relay 45 is energized which opens contact points 45a. Relay 80 is energized and will remain energized until the positioning cycle is completed, at which time potential is removed from the plate of tube 17, by the opening of relay contacts 37a. Thus motion will run only in slow forward or slow reverse for the remainder of the positioning cycle and normally open contacts 80b (FIGURE 8) will remain closed. The reason for this is two-fold, one, as motion is now approaching final position, it is important for purposes of accuracy to approach final position at slow speed. Secondly, the slow speed will allow the centrifugal brush (FIGURE 4) to contact commutator contacts 501 through 510 through the restorative action of spring 93. (FIGURE 4). The brush arm 518 (FIGURES 4 and 7) carrying brushes 76 and 84 is balanced on the opposite end by weight 520 which, at high speed, increases its radius of rotation by centrifugal force causing brushes 76 and 84 to be lifted from contact with slip ring 516. At slow speeds these brushes 76 and 84 return to contact with slip ring 516 through the action of spring 93. The insulating bushing 519 carries a guard 94 limiting the centrifugal effect to that necessary to sever brush contacts. In FIGURE 5 another method of breaking brush contact at high speed is shown, with a brush arm 97, restorative spring 98, pin 96 and housing 99.

The fourth stage of positioning is the same type as described for the first, second and third with the following exception. Relay 40 (direction sensing) has contact 40e( FIGURE 8a) mounted between point 411 and relay coil 47. This is to insure that motion is in forward direction when relay 47 is energized and control is transferred to the fifth stage. There are two reasons for doing this, first, there is an important mechanical phase relationship between the fourth stage brush 58 and fifth stage brush assembly 517a. Brush contacts 76 and 84 (FIGURE 8a) must make contact with commutator segments 82 (connected to 501) and 73 (connected to 511) simultaneously, immediately upon transfer of control from the fourth to the fifth stage of positioning. This may be accomplished by correct angular positioning of brush assembly 517a on shaft 413, which will insure correct selection of 10 bars on 100-bar fifth stage (FIGURE 7). Secondly the energizing of relay 47 and consequent closing of contacts 47a insures motion will always be in the forward direction at final position, thus removing all backlash in screw 18, FIGURE 1.

In the fifth positioning stage, if it is desired to use the first decimal division, in order to stop motion when brush 84 touches commutator bar 82 connected to terminal 501 (FIGURES 7 and 8a), control contacts 81 (FIGURE 8a), which are represented by button 0 of stage 5, FIGURE 2, bust be open in order that all others in this string of contact points may be closed. The function of contact points 81 is mechanical only, since opening 81 closes all the others in this string in the fifth positioning stage. Hence contact points 81 need not have an electrical connection.

If brush 58 is on the potential side of the selected open contact 72, FIGURE 8a, relay 40 is energized and the slow forward clutch 55 is energized. When brush 58 shunts selected open contact 72, relay 47 is energized through the closing of normally opened contacts 40e. At this time contacts 47a close to seal in relay 40, which provides for forward motion only for the remainder of the positioning cycle.

At any time prior to the energization of relay 47, if the encoder 19 is moved due to inertia or other causes, shunting contacts 10, 56 or 57 will be caused to move thereby removing potential from wires 13, 211 or 311. This serves to transfer the control back to the next preceding stage.

Contacts 47b are closed to seal in relay 47 and supply potential to brushes 76 and 84. If brush 58 had been on the no potential side of the selected open contact 72, relay 40 (direction sensing) would have been de-energized and slow reverse clutch 54 (FIGURE 8) would be energized. Motion would then run in slow reverse until brush 58 shunts selected open contact 72. Relay 40 is energized when brush 58 shunts selected open contact 72. Relay 47 will not be energized until relay contact 40e is closed. At this position brushes 76 and 84 are located at contacts 73 and 82 respectively. Energization of relay 40 and the closing of its contact 40e energizing relay 47 as described above will allow only forward motion during remainder of positioning cycle.

Relay contacts 47b when closed supply potential to brushes 76 and 84.

As previously explained, the fifth stage brush 76 is now located at commutator bar 73, which completes the circuit to ionize tube 17a. The current to relay 77 is limited by resistor 34 to an amount below that necessary to operate the relay 77 but sufficient to actuate the ionization process in tube 17a. Tube 17a conducts through parallel holding circuit, however, the current is not enough to energize coil of relay 77. Brush 84 continues to travel in a forward direction until it contacts commutator bar 85. The potential through this circuit is now sufficient to actuate relay 77. When relay 77 is energized, the contacts 77a (FIGURE 8) are open to de-energize relay 37. Relay contacts 37b close to energize brake 51. Relay contacts 37c and 37a open to remove power from motion clutches 52, 53, 54 and 55 (FIGURE 8) and motion control.

This is the end of one positioning cycle.

Provision is made in stage one of positioning device to approach the zero position moving in the forward direction from position indicated by 111 (FIGURE 8a) when contacts 121 are selected to be open instead of any other contacts in this string, such as 63. This applies only when brush assembly 10 is in contact with commutator bar 111. When contacts 121 are open, relay 120 is de-energized, closing normally closed contacts 120b and opening normally open contacts 120a. Opening these contacts 120a prevents energizing relay 120 back through the string of closed contacts 9 to 1 (FIGURE 2, stage 1) as potential is applied to commutator bar 111 through closed contacts 120b, causing forward motion of brushes 10 to the zero position, 101-102 (FIGURE 8a).

Opening contacts 120a by deenergizing relay 120 also prevents energizing relay 41 which would cause reverse motion by opening contacts 41a. When any contact in this string except zero is open, the relay 120 is energized.

The radially disposed commutator bars 101 through 111 illustrated in FIGURE 6 are denoted on electrical diagram, FIGURE 8a, and shown arranged in a horizontal line numbered 101 through 111. In like fashion, bars 201 through 211, 301 through 311 and 401 through 411 are shown and are also arranged in horizontal lines on electrical diagram, FIGURE 8a. Radially disposed contacts 501 through 510 are similarly arranged in a horizontal line in electrical diagram 8a.

Having thus described my invention what I claim as new and useful and desire to secure by United States Letters Patent is:

1. An electromechanic drive providing automatic linear motion and position control means comprising: a motor drive means, a terminal drive shaft terminating in a lead screw, said terminal drive shaft provided with an electromagnetic brake and connected to motor drive means through a train of four spur gears of equal diameter, the four shafts of said spur gears being equally spaced and connected to four shaft extensions on the motor drive side through four electromagnetic clutches, the fourth of said four shaft extensions, counting from said terminal drive shaft, connected directly to said motor drive means, giving rapid reverse motion through its clutch to terminal drive shaft, the third drive shaft extension connected to motor drive shaft by timing belt giving rapid forward motion through its clutch to terminal drive shaft, the third and second shaft extensions connected by double speed reducing worm gears and the second and first of said shaft extensions connected by a timing belt; an encoder, consisting basically of a plurality of encoder commutators embracing four parallel encoder shafts, the first of said four parallel encoder shafts integral with above said terminal drive shaft and connected serially to a second, a third and a fourth encoder drive shaft by means of index gearing arranged by pin contacts to cause a reduction of one to ten in speed between successive shafts or a reduction of one to one thousand between first shaft integral with above said terminal drive shaft and the fourth of said encoder shafts, each said encoder shaft bearing a brush assembly, insulated from its shaft and carrying three electrically connected contact brushes, one each of which makes sliding contact with a fixed slip ring and two of which make contact one-tenth revolution apart, contacting, during one revolution, nine equally spaced commutator segments, and two, the first and the last in cycle sequence, occuping together space equal to each of said nine commutator segments; a data input selector device having a number of rows of decade contact push buttons equal in number to the number of said encoder commutators with provision that only one button at a time in each row may be selected to open circuit in that row, each button in a given row controlling a possible open circuit between contiguous commutator segments on one of above said encoder commutators; an electrical network providing means for connecting above said motor drive means to commercial alternating current line, means for rectifying alternating current for direct current operation of above said electromagnetic brake and clutches, means for rectifying alternating current for direct current operation of relays and thermionic switching devices used in circuitry connecting above said encoder and above said electromagnetic brake and clutches, unidirectional conducting elements, resistors and capacitors, constituting means for a positional control device operable in response to data input intelligence with unidirectional characteristics, providing operation at two speeds forward or reverse with low torque and low inertia of moving parts, and providing automatic means for duplicated settings, of extreme accuracy.

2. A device as described in claim 1, in which a fifth decoder commutator is provided, concentrically mounted on first decoder shaft, having three electrically connected brushes, insulated from said shaft, the third of said brushes making continuous contact with a fixed slip ring, the first and second of said contact brushes spaced radially and both making contact with a multiplicity of commutator segments, said commutator segments being arranged in ten groups of ten commutator segments, commutator segments 1, 2, 3, 4, 5, 6, 7, 8, 9 and 10, in each group, connected in parallel, respectively, with corresponding numbered segments in nine other groups, with the first commutator segment in each group divided, allowing first said brush to contact first portion of the tenth segment and second said brush to contact second portion of same segment simultaneously, the first portions of said tenth segment being electrically connected in parallel and provided with means for circuit connection, said first and second brushes mounted on a pivoted arm provided with weight on opposite end of pivoted portion to cause centrifugal force at high speeds to lift said first and second brushes off commutator segments, said pivoted arm provided with a spring to restore contact of said first and second brushes with commutator segments at slow rotational speeds, said structures providing the electrical equivalent of an additional encoder commutator on an additional encoder shaft.

3. In a device as described in claim 1, an electrical network means provided for connecting motor drive means to commercial alternating current line, having an alternating current relay with first, second and third normally open relay switches, said first and second relay switches connected in series with the motor drive means across the power line, the said third switch connected in series with the winding of said alternating current relay across the power line, provided with a normally open push button switch shunting said third relay switch, allowing starting of motor drive means by momentarily closing said normally open push button switch with a normally closed push button switch in one side of power line between motor drive means and relay, providing for stopping motor drive means by momentarily opening said normally closed push button switch.

4. In an electromagnetic drive providing automatic linear motion and position control means comprising a motor drive means, a terminal drive shaft ending in a lead screw, an encoder, a data input selector, an electrical network, a first bridge rectifier provided with input connected across alternating current power line and output provided for operation of electromagnetic brake and first, second, third and fourth electromagnetic clutches, numbering from clutch on terminal drive shaft as first, a second bridge rectifier is provided with input connected across alternating current power line and output providing energy for direct current line for the operation of nine direct current relays and two thermionic switching devices, output shunted by filter capacitor and including a resistor in series with each output connection means having connection to one side of direct current power line through a first, normally open, switch, and said first relay, said normally open switch of said first relay shunted by a normally open position push button switch, second switch, normally closed, of said first relay included in series with above said electromagnetic brake and a third, normally open, switch of said first relay included in series with direct current line supplying above said electromagnetic clutches providing for starting of operation by momentarily closing position push button switch, actuating said first relay, closing said first switch of said first relay, opening said second switch of said first relay, releasing said electromagnetic brake and supplying power through said third switch of said first relay to circuit mesh controlling action of said electromagnetic clutches, resulting in closing above said fourth electromagnetic clutch and actuating the high speed reverse drive.

5. In an electromagnetic drive providing automatic linear motion and position control means comprising a motor drive means connected to a terminal drive shaft and lead screw through speed and direction control means, and an encoder consisting basically of five commutator encoder units, data input selector means for rectifying alternating current for operation of said speed and direction control means, means for rectifying alternating current for direct current operation of encoder and circuitry connection for operating said speed and direction control means; means provided for the operation of said speed and direction control means by first unit of said encoder comprising connection of a first commutator segment of first encoder unit to high side of direct current line, connections of successive buttons 0, 1 through 9 of the first row on said data input selector means between commutator segments one and two, 2 and 3, through 10 and 11 successively in the same order, commutator segment 11, of first of said five units connected to low voltage side of direct current line through the winding of second direct current relay and resistor in series, said second relay operating a normally closed switch connecting slip ring of commutator of first of said five encoder units to low side of direct current line through winding of a third relay and series resistor, said third relay operating a normally closed first switch in series with high speed reverse clutch in above said speed and direction control means, normally open second switch in series with high speed direct drive clutch in said speed and direction control means, a normally closed third switch in series with low speed reverse drive clutch in said speed and direction control means, a normally open fourth switch in series with slow speed direct drive clutch in said speed and direction control means, and a fifth, normally open, switch in the fourth of said five commutator encoder units, a fourth relay connected between the second commutator segment of said first unit and the low side of the direct current line and operating a normally closed switch between the high voltage side of the direct current line and the eleventh commutator segment of the first encoder unit, a normally open switch connecting the tenth commutator segment to the common connection between buttons eight and nine of said data input selector means, a second normally open switch connecting the eleventh commutator segment to the outside terminal of button nine of said data input selector means.

6. In a device as described in claim 5 means provided for the operation of said speed and direction control means by a second unit of said five commutator encoder units comprising: connection from the output of button nine of first row of said data input selector means to the first commutator segment of second commutator encoder unit, connections of successive buttons 0, 1 . . . 9 of second row on data input selector means between commutator segments 1 and 2, 2 and 3, and through 10 and 11, successively in the same order, commutator segment eleven connected to low potential side of direct current line through the fifth relay and resistor in series, the fifth relay operating normally closed switch connected between slip ring of second encoder unit and high potential side of above said third relay through a unidirectionally conducting device.

7. In a device as described in claim 5 means are provided for the operation of said speed and direction control means by a third unit of said five commutator encoder units comprising: connection from the output of button nine of second row of said data input selector to the first commutator segment of the third commutator encoder unit, connections of successive buttons 0, 1, and through 9 of third row on data input selector means between commutator segments 1 and 2, 2 and 3, and through 10 and 11, successively in the same order, the last commutator segment connected to low side of direct current line through a sixth relay and resistor in series, said sixth relay having normally closed switch connected between slip ring of said third unit and high potential side of above said third relay through connection having unidirectional conductive means, the last segment of commutator of said third unit connected through resistor to the grid of thermionic conducting device, said thermionic conducting device having cathode connected to the low voltage side of direct current line and having a resistor shunting cathode and anode, the anode of said thermionic conducting device connected to high voltage side of direct current line through winding of a seventh relay, said seventh relay having normally closed first switch controlling operation of above said high speed reverse clutch and high speed direct clutch in above said speed and direction control means, said seventh relay having second switch, normally open, controlling operation of above said low speed reverse clutch and low speed direct drive clutch in above said speed and direction control means.

8. In a device as described in claim 5 means provided for the operation of said speed and direction control means by a fourth unit of said five commutator encoder units comprising: connection from output of button nine of third row of said data input selector means to first commutator segment of fourth commutator encoder unit, connections of successive buttons 0, 1, 2 and through 9 of the fourth row on data input selector means between commutator segments 1 and 2, 2 and 3, and through 10 and 11, successively in the same order, the last commutator segment connected to the low potential side of the direct current line through an eighth relay and resistor in series, controlling normally open first switch between high side of direct current line and high potential side of above said third relay, and controlling second normally open switch between high side of direct current line and the last commutator segment of said fourth unit through a unidirectional conducting device, a resistor and capacitor in series between the high side of direct current line and the last segment of said fourth encoder unit.

9. In a device as described in claim 5 means provided for the operation of said speed and direction control means by a fifth unit of said five commutator encoder units comprising: connection of slip ring of fifth unit of above said five commutator encoder units to high potential side of direct current line through above said first normally open switch of an eighth relay, connections of successive buttons, 0, 1, 2 and through 9 of the fifth row of data input selector means between commutator segments 1 and 2, 2 and 3 and through 9 and 10, successively in the same order, said last commutator segment connected to slip ring of said fifth unit through resistor and to low potential side of direct current line through another resistor, commutator segments of said fifth unit also connected through a ninth relay to anode of thermionic conducting device, said thermionic conducting device having cathode connected to low potential side of direct current line, resistor shunting anode and cathode, grid of said thermionic conducting device connected to low potential side of direct current line through resistor and to split portion of the first segment of commutator of said fifth decoder unit through capacitor, said split portion of said first segment of commutator of said fifth decoder unit connected to low potential side of direct current line through a resistor.

10. A device for digital positioning of a movable element, comprising the combination of a drive means, a rotary shaft connected to said drive means, a pair of brushes on said shaft, a voltage source, a control circuit having relays, electronic tubes, capacitors, resistors and rectifiers arranged to automatically position said rotary shaft to a preselected position, a data input means connected to said control circuit, a control commutator consisting of a plurality of radially arranged contacts connected to said voltage source and said control circuit and said input means, said pair of brushes on said rotary shaft arranged to make selective connections with contacts on said control commutator whereby said rotary shaft is automatically positioned.

No references cited.

BENJAMIN DOBECK, *Primary Examiner.*

T. LYNCH, *Assistant Examiner.*